United States Patent
Agarwal

(10) Patent No.: US 10,749,993 B2
(45) Date of Patent: Aug. 18, 2020

(54) PATH SELECTION USING TCP HANDSHAKE IN A MULTIPATH ENVIRONMENT

(71) Applicant: International Business Machines Corporation, Armonk, NY (US)

(72) Inventor: Kanak B. Agarwal, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/414,182

(22) Filed: May 16, 2019

(65) Prior Publication Data

US 2019/0273811 A1    Sep. 5, 2019

Related U.S. Application Data

(63) Continuation of application No. 14/164,422, filed on Jan. 27, 2014, now Pat. No. 10,362,148.

(51) Int. Cl.
H04L 29/06 (2006.01)

(52) U.S. Cl.
CPC .................................. *H04L 69/163* (2013.01)

(58) Field of Classification Search
CPC .................................................... H04L 69/163
See application file for complete search history.

(56) References Cited

U.S. PATENT DOCUMENTS

| | | | |
|---|---|---|---|
| 6,587,438 B1 * | 7/2003 | Brendel | H04L 1/1858 370/238 |
| 7,590,756 B2 | 9/2009 | Chan | |
| 8,260,938 B2 | 9/2012 | Gupta | |
| 9,521,028 B2 * | 12/2016 | van Bemmel | H04L 29/06 |
| 2003/0086422 A1 | 5/2003 | Klinker | |
| 2006/0198300 A1 | 9/2006 | Li | |
| 2007/0230352 A1 | 10/2007 | Kokku | |
| 2008/0062879 A1 * | 3/2008 | Sivakumar | H04L 29/1249 370/235 |
| 2008/0276297 A1 | 11/2008 | Shay | |
| 2010/0211673 A1 | 8/2010 | Kosbab et al. | |
| 2012/0331160 A1 * | 12/2012 | Tremblay | H04L 67/28 709/228 |

(Continued)

OTHER PUBLICATIONS

List of all IBM related applications, Appendix P 2019.

*Primary Examiner* — Philip J Chea
*Assistant Examiner* — Robert B McAdams
(74) *Attorney, Agent, or Firm* — Garg Law Firm, PLLC; Rakesh Garg; Brian Welle

(57) ABSTRACT

A plurality of SYN packets is sent from a first system, each of the plurality of SYN packets traverses a different path in a first set of paths between the first system and a second system in a multipath data communication network and includes a unique source identifier. From a plurality of SYN-ACK packets, a SYN-ACK packet is selected that is first to arrive at the first system. Each SYN-ACK packet includes a unique source identifier of a selected SYN packet. A path is configured corresponding to the selected SYN packet, as an outbound path from the first system. A path corresponding to the selected SYN-ACK packet is configured as an inbound path to the first system. A session between the first and the second systems is established using the outbound and inbound paths.

20 Claims, 14 Drawing Sheets

(56) References Cited

U.S. PATENT DOCUMENTS

| | | | | |
|---|---|---|---|---|
| 2014/0153583 A1* | 6/2014 | Gouache | ............. | H04L 12/6418 370/437 |
| 2015/0215345 A1* | 7/2015 | Agarwal | ............... | H04L 69/163 709/227 |
| 2015/0350337 A1* | 12/2015 | Biswas | ................. | H04L 67/142 709/228 |
| 2016/0315976 A1* | 10/2016 | Detal | .................. | H04L 65/1069 |

* cited by examiner

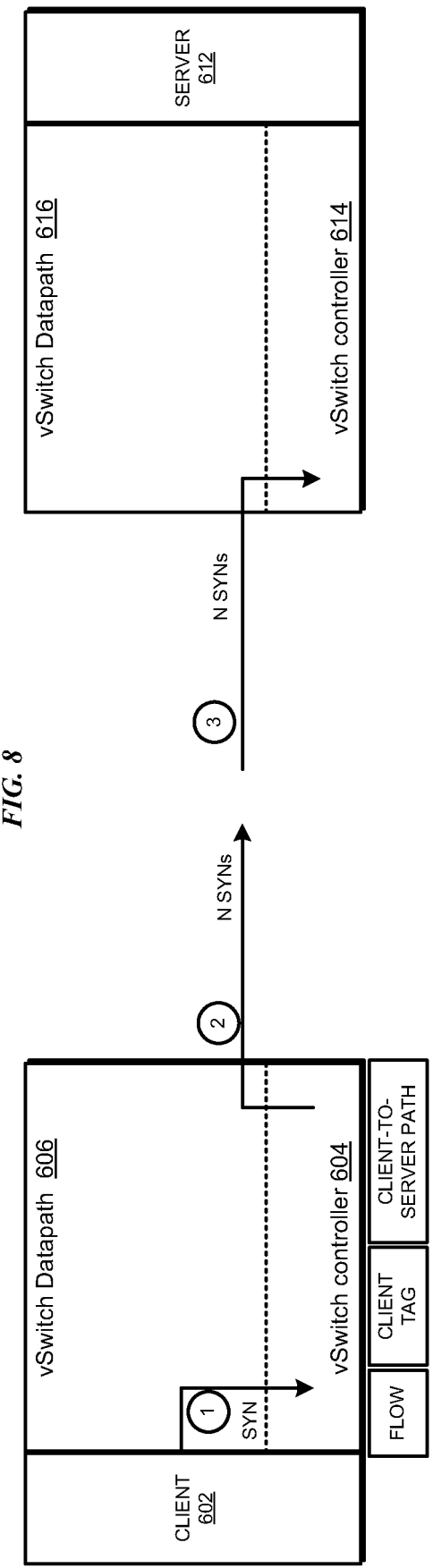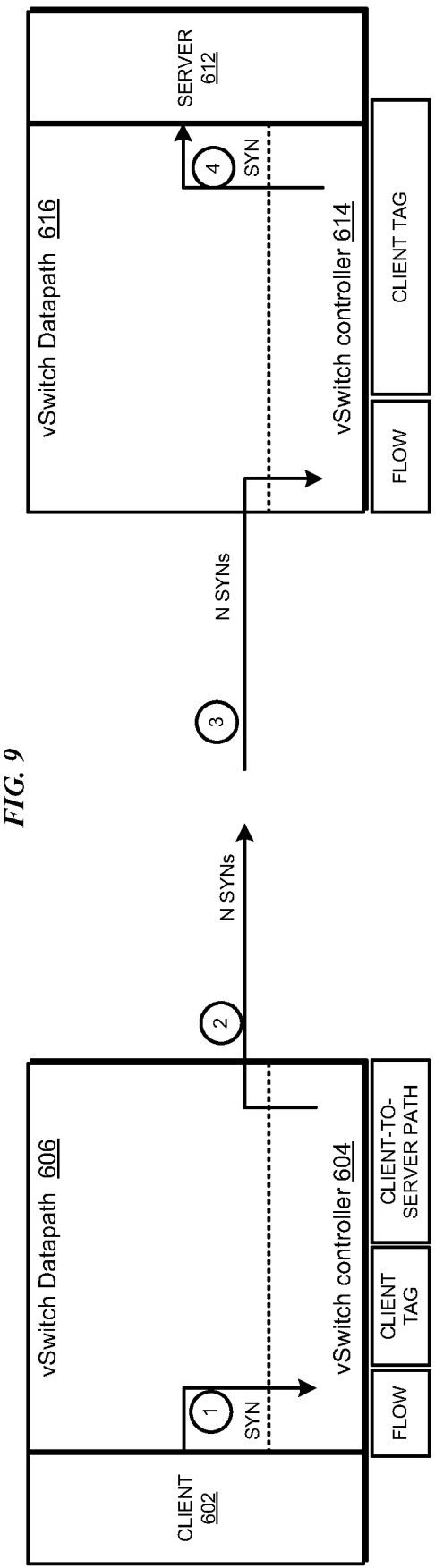
FIG. 8
FIG. 9

PATH SELECTION USING TCP HANDSHAKE IN A MULTIPATH ENVIRONMENT

TECHNICAL FIELD

The present invention relates generally to a method, system, and computer program product for establishing Transmission Control Protocol (TCP) sessions. More particularly, the present invention relates to a method, system, and computer program product for path selection using TCP handshake in a multipath environment.

BACKGROUND

A multipath network is a data network in which more than one outgoing communication paths are available for sending data from a first data processing system to a second data processing system, more than one incoming communications paths are available for receiving data at the first data processing system from the second data processing system, or both. A data communication session, e.g., a TCP session between the first data processing system and the second data processing system, can use any one of the outgoing paths and any one of the incoming paths. A multipath environment is a data processing environment where a multipath network is deployed.

TCP is a commonly used communication protocol used for communicating packet data from one data processing system to another over a data network. Establishing a TCP session between two data processing systems involves a multi-step exchange of preliminary information between the two systems. This multi-step exchange of information is called a three-way handshake.

A first step of a three-way handshake occurs when, to initiate a TCP session, a first data processing system sends a request (SYN packet) to the second data processing system to synchronize the first data processing system's sequence number. A second step of the three-way handshake occurs when the second data processing system sends a request to the first data processing system to synchronize the second data processing system's sequence number and an acknowledgement of the first data processing system's sequence number (SYN-ACK packet). A third step of the three-way handshake occurs when the first data processing system sends an acknowledgment of the second data processing system's sequence number (ACK packet). Thus, the sequence numbers of the first and second data processing systems are synchronized in both data processing systems, and the TCP session is established, starting from these synchronized sequence numbers.

SUMMARY

The illustrative embodiments provide a method, system, and computer program product for path selection using TCP handshake in a multipath environment. An embodiment includes a method for path selection using TCP handshake in a multipath environment. The embodiment sends, from a first application executing using a processor and a memory in a first data processing system, a plurality of SYN packets, wherein each of the plurality of SYN packets traverses a different path in a first set of paths between the first data processing system and a second data processing system in a multipath data communication network, each of the plurality of SYN packets including a corresponding unique source identifier. The embodiment selects, at the first application, from a plurality of SYN-ACK packets, a SYN-ACK packet, wherein the selected SYN-ACK packet is first to arrive at the first application as compared to other SYN-ACK packets in the plurality of SYN-ACK packets, wherein each SYN-ACK packet in the plurality of SYN-ACK packets includes a unique source identifier of a selected SYN packet in the plurality of SYN packets. The embodiment configures a path from the first set of paths, corresponding to the selected SYN packet, as an outbound path from the first data processing system. The embodiment configures a path from a second set of paths, corresponding to the selected SYN-ACK packet, as an inbound path to the first data processing system. The embodiment establishes a Transport Control Protocol (TCP) session between the first data processing system and the second data processing system using the outbound path and the inbound path.

Another embodiment includes a computer usable program product comprising a computer readable storage device including computer usable code for path selection using TCP handshake in a multipath environment. The embodiment further includes computer usable code for sending, from a first application executing using a processor and a memory in a first data processing system, a plurality of SYN packets, wherein each of the plurality of SYN packets traverses a different path in a first set of paths between the first data processing system and a second data processing system in a multipath data communication network, each of the plurality of SYN packets including a corresponding unique source identifier. The embodiment further includes computer usable code for selecting, at the first application, from a plurality of SYN-ACK packets, a SYN-ACK packet, wherein the selected SYN-ACK packet is first to arrive at the first application as compared to other SYN-ACK packets in the plurality of SYN-ACK packets, wherein each SYN-ACK packet in the plurality of SYN-ACK packets includes a unique source identifier of a selected SYN packet in the plurality of SYN packets. The embodiment further includes computer usable code for configuring a path from the first set of paths, corresponding to the selected SYN packet, as an outbound path from the first data processing system. The embodiment further includes computer usable code for configuring a path from a second set of paths, corresponding to the selected SYN-ACK packet, as an inbound path to the first data processing system. The embodiment further includes computer usable code for establishing a Transport Control Protocol (TCP) session between the first data processing system and the second data processing system using the outbound path and the inbound path.

Another embodiment includes a data processing system for path selection using TCP handshake in a multipath environment. The embodiment further includes a storage device including a storage medium, wherein the storage device stores computer usable program code. The embodiment further includes a processor, wherein the processor executes the computer usable program code. The embodiment further includes computer usable code for sending, from a first application executing using a processor and a memory in a first data processing system, a plurality of SYN packets, wherein each of the plurality of SYN packets traverses a different path in a first set of paths between the first data processing system and a second data processing system in a multipath data communication network, each of the plurality of SYN packets including a corresponding unique source identifier. The embodiment further includes computer usable code for selecting, at the first application, from a plurality of SYN-ACK packets, a SYN-ACK packet, wherein the selected SYN-ACK packet is first to arrive at the first application as compared to other SYN-ACK packets in the plurality of SYN-ACK packets, wherein each SYN-ACK packet in the plurality of SYN-ACK packets includes a unique source identifier of a selected SYN packet in the plurality of SYN packets. The embodiment further includes computer usable code for configuring a path from the first set of paths, corresponding to the selected SYN packet, as an outbound path from the first data processing system. The embodiment further includes computer usable code for configuring a path from a second set of paths, corresponding to the selected SYN-ACK packet, as an inbound path to the first data processing system. The embodiment further includes computer usable code for establishing a Transport Control Protocol (TCP) session between the first data processing system and the second data processing system using the outbound path and the inbound path.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 8 depicts another step in an example process of path selection using TCP handshake in a multipath environment using a modified v-switch or a modified controller in accordance with an illustrative embodiment;

FIG. 9 depicts another step in an example process of path selection using TCP handshake in a multipath environment using a modified v-switch or a modified controller in accordance with an illustrative embodiment;

DETAILED DESCRIPTION

Figure 1:
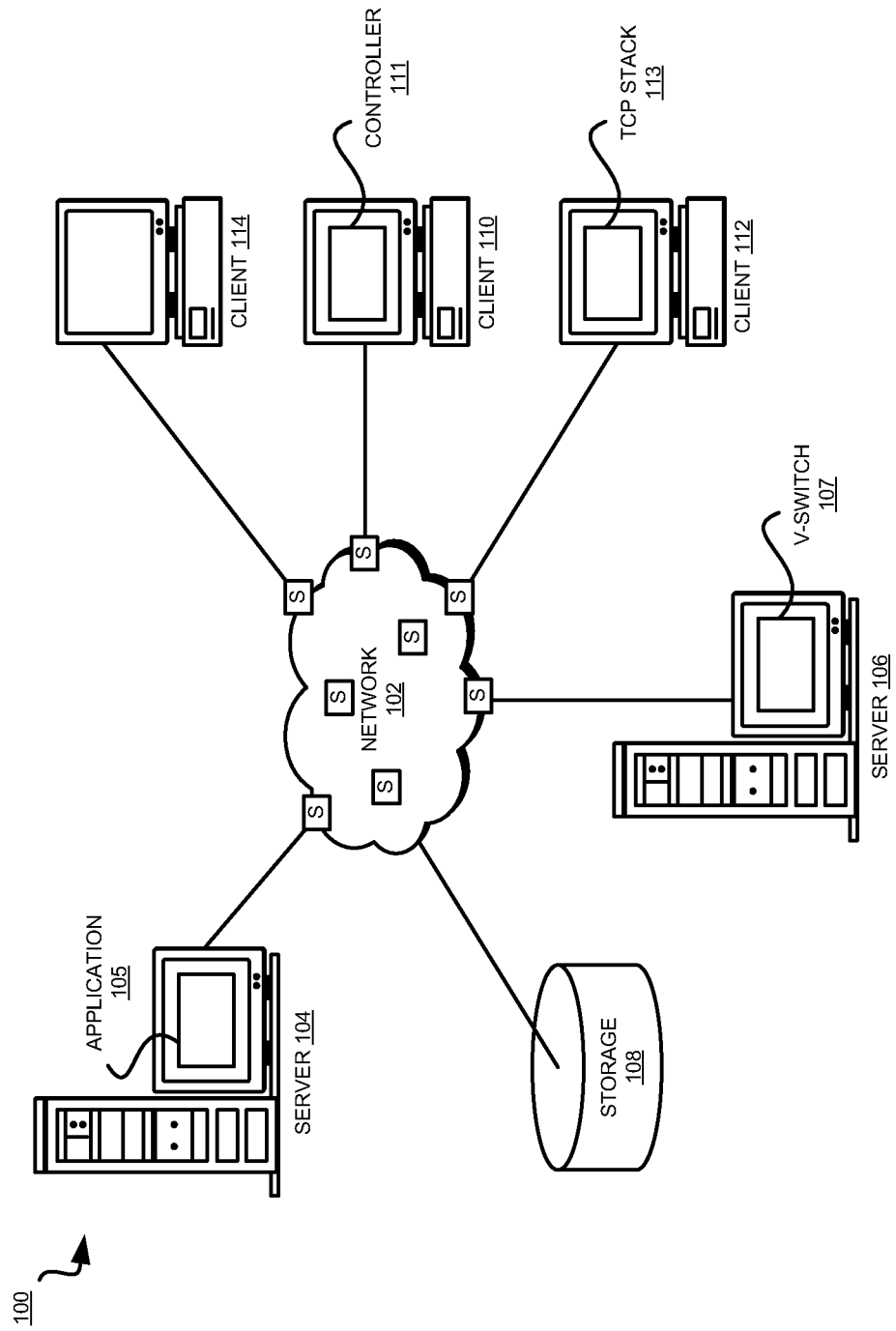
FIG. 1 depicts a block diagram of a network of data processing systems in which illustrative embodiments may be implemented.

The illustrative embodiments recognize that in a multipath environment a source data processing system has more than one available paths to a particular destination data processing system, and vice versa. The illustrative embodiments further recognize that not all available paths offer the same level of performance.

For example some paths, although available, may be more congested than other paths. As another example, some paths may be longer than others, and may traverse more switches or other networking components and links than others, to reach the same destination data processing system.

Furthermore, the illustrative embodiments recognize that the performance of a path can change over time. For example, a path that is the least congested and fastest path between two data processing systems can become congested over time exhibit degraded performance due to the increased congestion. As another example, a path that traverses more networking components than another path may exhibit superior performance than the other path if the other path becomes congested, one or more networking components in the path experience a load reduction, or a combination of these and other factors.

At least two data processing systems are involved in a TCP session. Therefore, the illustrative embodiments recognize that the efficiencies of both paths—an outgoing path from a first data processing system to a second data processing system, and an incoming path to the first data processing system from the second data processing system—are a factor in the overall latency and performance of the TCP session.

The illustrative embodiments recognize that presently available methods for establishing a TCP session in a multipath network do not include a method to detect the most efficient available path. Consequently, presently available methods for selecting a path for a TCP session in a multipath network do not consider the efficiencies of the various available paths. Furthermore, presently available methods for establishing a TCP session in a multipath network do not include a method to change a path in an ongoing TCP session when the performance of the used path degrades, an alternative path with comparably better performance becomes available, or both.

The illustrative embodiments used to describe the invention generally address and solve the above-described problems and other problems related to path selection in multipath networks. The illustrative embodiments provide a method, system, and computer program product for path selection using TCP handshake in a multipath environment.

An embodiment uses a modified three-way handshake to find the fastest outgoing and incoming paths in a multipath network for establishing a TCP session. Once a TCP session established and ongoing, an embodiment further uses a modified two-way handshake to find out if a better outgoing path is available in the multipath network to replace the outgoing path currently in use in the TCP session. A commonly used two-way handshake in TCP is when one data processing system sends a SYN packet to a second data processing system and the second data processing system responds with an ACK packet corresponding to that SYN packet.

The illustrative embodiments are described with respect to certain packets, identifiers, sequence numbers, locations in data packets for communicating the identifiers or sequence numbers, data processing systems, environments, components, configurations, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
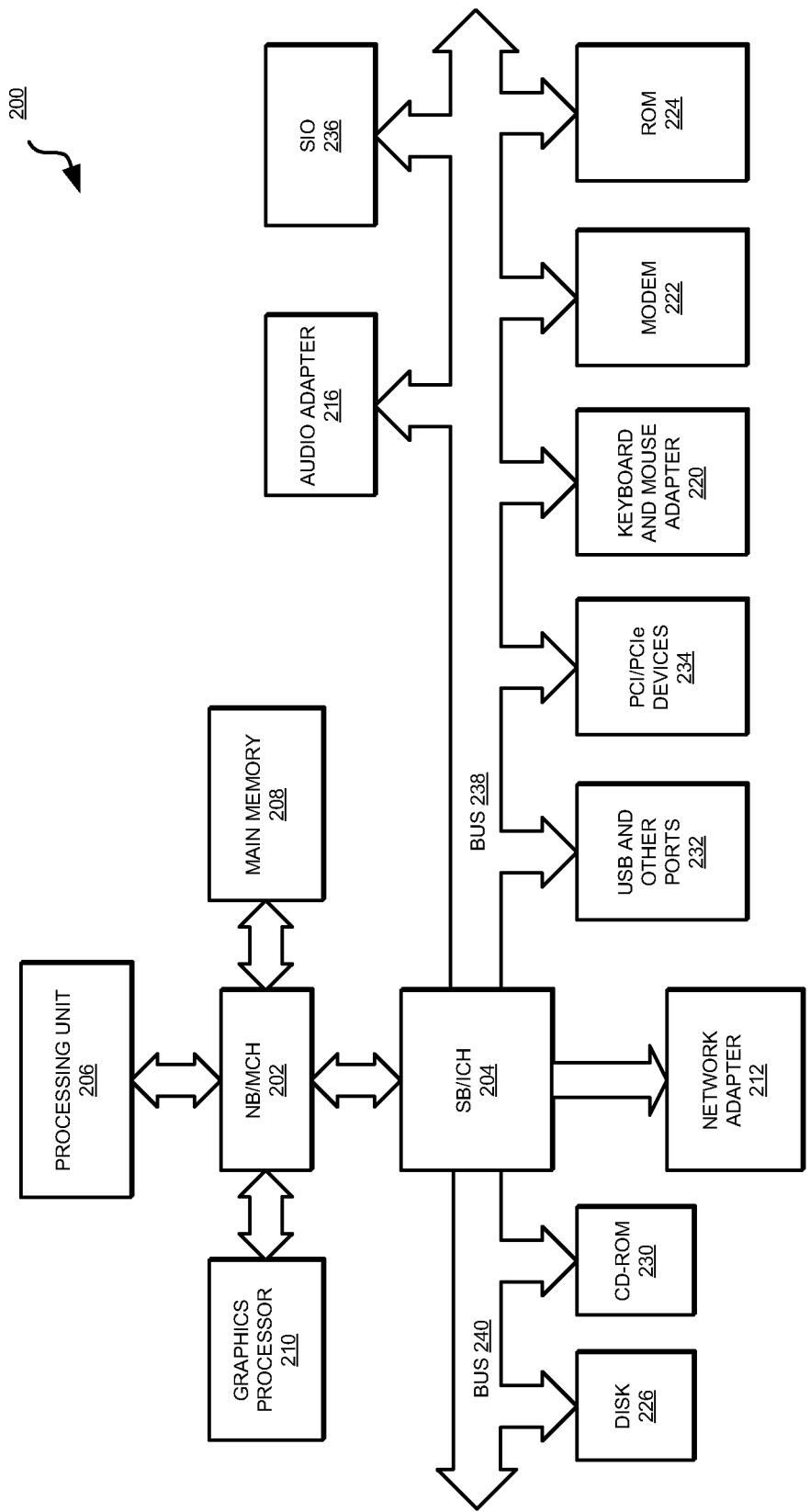
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of data processing systems in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any data processing system or device in data processing environment 100. Clients 110, 112, and 114 also couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. Servers 104 and 106, and clients 110, 112, 114, are depicted as servers and clients only as example. Data processing systems 104, 106, 110, 112, and 114 also represent example nodes in a cluster, partitions, hosts, and other configurations suitable for implementing an embodiment. Network 102 includes a multipath network facilitated by any number and type of networking devices labeled "S" that are interconnected by any suitable data communication medium. Server 104 includes application 105, which implements an embodiment described herein. The term "application" is used to describe implementation 105 of an embodiment only as an example, without implying any limitation that such implementation executes above an operating system in the user space of a data processing system. Generally, application 105 may execute in any suitable location in a given configuration without any limitation. In one embodiment, application 105 comprises code that executes in a kernel of a data processing system, v-switch, or another type of networking component. In such an embodiment, application 105 can be implemented as a part of an operating system or firmware of the device where application 105 is to execute. In one embodiment, application 105 modifies, uses, or otherwise operates in conjunction with an existing application for controlling TCP operations, such as controller 111, which is available in a presently implemented hypervisor, to perform an operation described herein. In another embodiment, application 105 modifies, uses, or otherwise operates in conjunction with, existing networking component, such as a switch, a router, or virtual switch (v-switch) 107 to perform an operation described herein. In another embodiment, application 105 modifies, uses, or otherwise operates in conjunction with, existing TCP stack, such as TCP stack 113 to perform an operation described herein. In one implementation, server 104 comprises one or more physical or virtual data processing systems in a cloud computing environment, and application 105 is a service, accessible to v-switch 107, controller 111, or TCP stack 113 over network 102.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

Servers 104 and 106, storage unit 108, and clients 110, 112, and 114 may couple to network 102 using wired connections, wireless communication protocols, or other suitable data connectivity. For example, a cluster typically has multiple network types, such as IP networks, direct connections of machines via packets exchange implemented by storage protocols (Fibre Channel, SCSI), serial links, and message exchange via writing and reading packets to shared storage such as a hard disk drive. For performance reasons, in sending client traffic, an IP network is given precedence. Furthermore, a given network type may not connect to all nodes in a cluster. For instance, a cluster may span machines located at two geographically distant sites. For the long distance connection, a wide area IP network may be the preferred connection, and within a geographical location, a direct connection or local area network may be preferable. Additionally, within a geographical location, additional non-IP networks, such as Fibre channel or serial connections may be used within the scope of the illustrative embodiments.

Clients 110, 112, and 114 may be, for example, personal computers, network computers, thin clients, or industrial control systems. In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another, and encompasses components including but not limited to IP and SAN components. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), a wide area network (WAN), or mobile ad hoc network (MANET). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104, server 106, or client 112 in FIG. 1, or another type of device in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may include one or more processors and may be implemented using one or more heterogeneous processor systems. Graphics processor 210 may be coupled to NB/MCH 202 through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204 through bus 238.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Program instructions for the operating system, the object-oriented programming system, the processes of the illustrative embodiments, and applications or programs, including application 105, v-switch 107, controller 111, and TCP stack 113 in FIG. 1, are each located on one or more storage devices, such as hard disk drive 226 or CD-ROM 230, and may be loaded into at least one of one or more memories, such as main memory 208, read only memory 224, or one or more peripheral devices, for execution by processing unit

206. Program instructions may also be stored permanently in non-volatile memory and either loaded from there or executed in place. For example, a program code according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA) or another mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
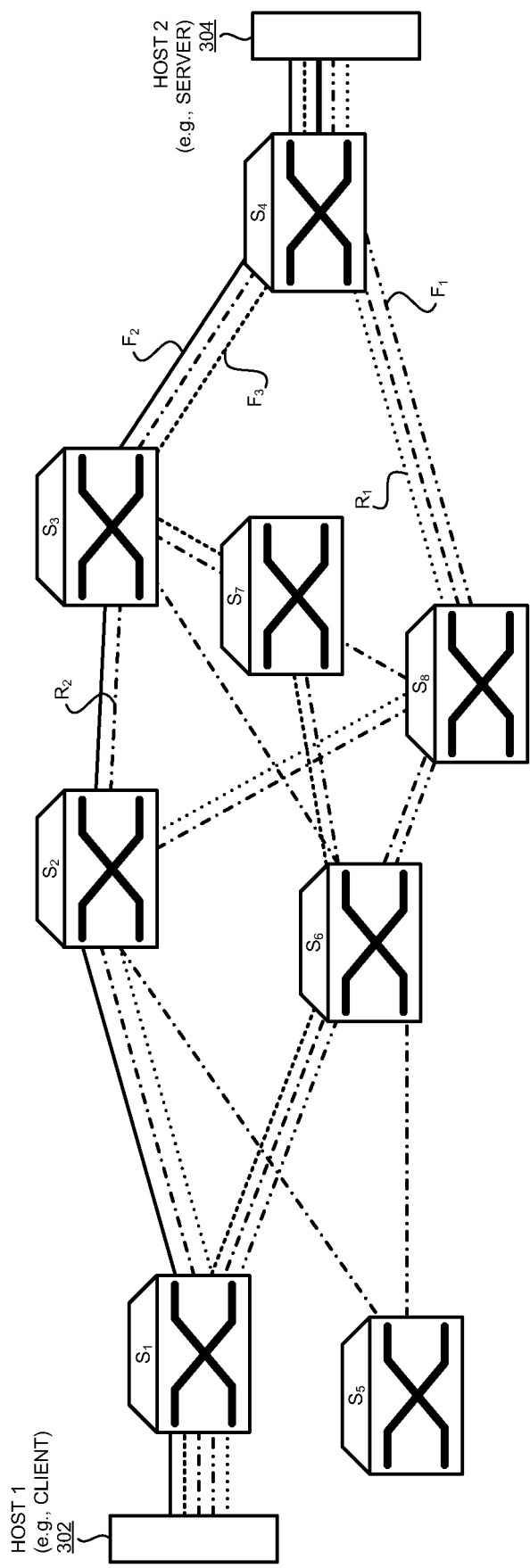
FIG. 3 depicts a block diagram of a configuration for path selection using TCP handshake in a multipath environment in accordance with an illustrative embodiment.

With reference to FIG. 3, this figure depicts a block diagram of a configuration for path selection using TCP handshake in a multipath environment in accordance with an illustrative embodiment. Data processing system 302, labeled "Host 1," is any data processing system that initiates a TCP session, e.g., a hosting node, a partition, a client, a server, or a virtual data processing system. In one embodiment, data processing system 302 is an example of client 112 in FIG. 1. Data processing system 304, labeled "Host 2," is any data processing system that receives a request to initiate a TCP session, e.g., a hosting node, a partition, a client, a server, or a virtual data processing system. In one embodiment, data processing system 304 is an example of server 104 in FIG. 1.

Each of networking devices S1, S2, S3, S4, S5, S6, S7, and S8 is an example of a networking device "S" in FIG. 1. In some implementation, a networking device can be a data processing system, e.g., server 106 of FIG. 1.

Networking devices S1-S8 form a multipath network between host 1 and host 2. Paths F1, F2, and F3 are example available outgoing path options from host 1 to host 2. Paths R1 and R2 are example incoming available path options from host 2 to host 1. For example, path F1 comprises networking device S1, S6, S8, and S4, wherein data packets from host 1 can flow through those devices and the corresponding links in that order to reach host 2. Other outgoing and incoming paths are similarly discernible from the depictions of FIG. 3. Many other paths (not shown) are also possible but only a limited number of paths may be chosen for a pair of hosts and configured in the networking devices for packet forwarding. Additional paths are not shown or labeled in FIG. 3 for clarity without implying any limitation.

As an example, consider that, at a given time, a path between host 1 and host 2 using device S2, is more congested than another available path using device S8 and avoiding device S2. Furthermore, over time, some of the network traffic overloading device S2 may abate, causing a previously comparatively slow path option through previously congested device S2 to become a comparatively fast path alternative through the now-less-congested device S2.

As another example, the link between devices S7 and S8 may be a slow link as compared to some other links in the multipath network, and a path that uses both S7 and S8 is likely to be a slower path than another path option. Alternatively, at a given time, some links in the network may become more congested than other links because of higher network traffic flowing on these links compared to their capacities. In this case, the paths using the congested links may become slower than the paths that use the non-congested links. Similarly, for many other reasons, some available paths in the depicted multipath network may be faster than other available paths.

Using presently available TCP session establishment methods in multipath networks, host 1 cannot know which available path is comparatively the fastest available path in a set of available paths, and consequently cannot make an affirmative selection of such a path from the set of available paths. Using presently available TCP session establishment methods in multipath networks, host 1 also cannot know which available path is comparatively the fastest available path in a set of available paths during a TCP session, and consequently cannot switch the active TCP session to such a path from the set of available paths.

Figure 4:
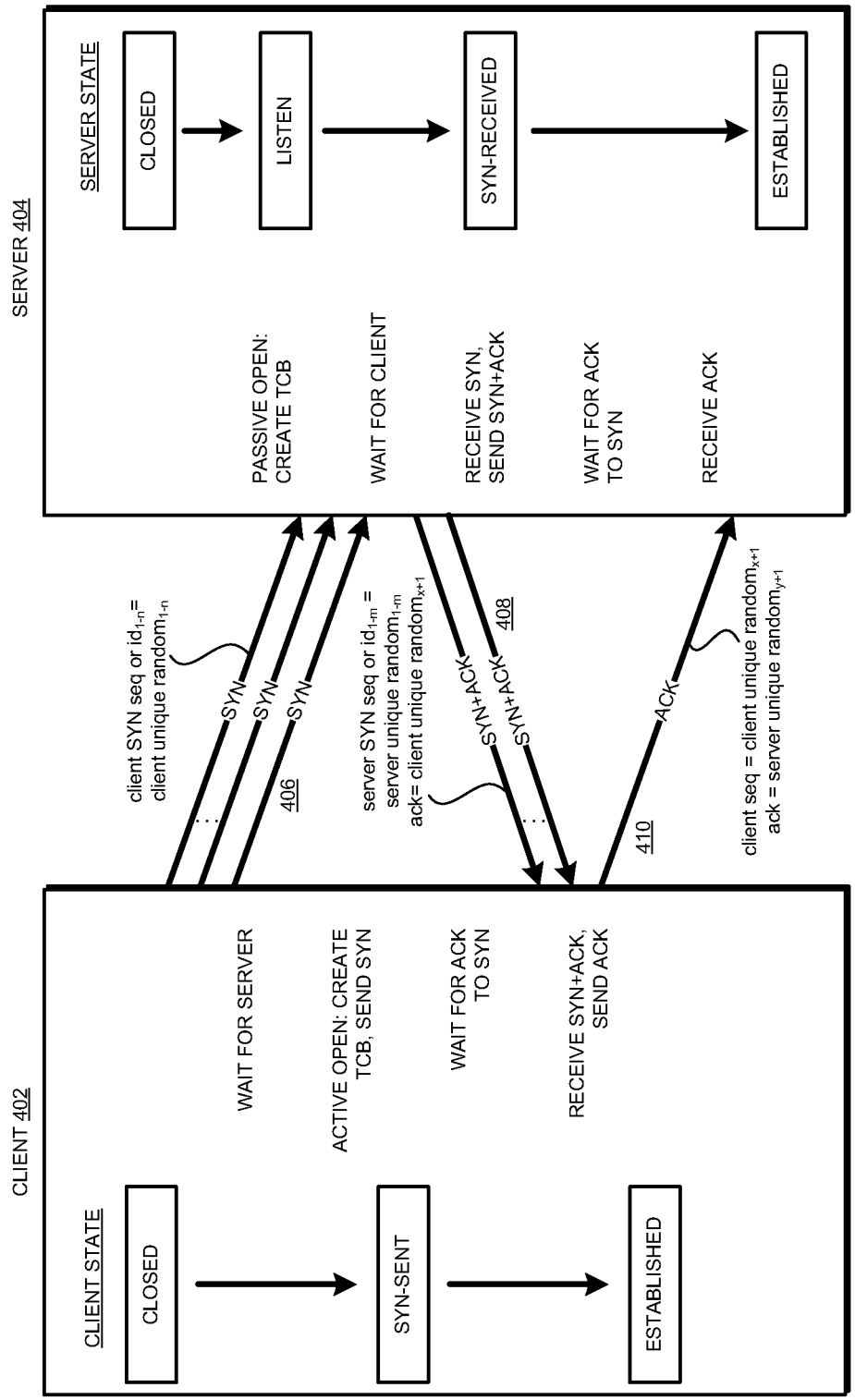
FIG. 4 depicts a block diagram of an example modification of a TCP three-way handshake for path selection using TCP handshake in a multipath environment in accordance with an illustrative embodiment.

With reference to FIG. 4, this figure depicts a block diagram of an example modification of a TCP three-way handshake for path selection using TCP handshake in a multipath environment in accordance with an illustrative embodiment. Data processing system 402 is an example of node 1 302 in FIG. 3, and is represented as a client only as an example without implying any limitation to such a role. Data processing system 404 is an example of node 2 304 in FIG. 3, and is represented as a server only as an example without implying any limitation to such a role.

Within client 402, the "client states" occur during a standard TCP three-way handshake as well as during the modified three-way handshake as described herein. Within server 404, the "server states" occur during a standard TCP three-way handshake as well as during the modified three-way handshake as described herein.

Assume that n outgoing paths are available between client 402 and server 404. Similarly, assume that m incoming paths are available from server 404 to client 402.

To initiate a TCP session, client 402 sends n SYN packets, one on each of n available outgoing paths to server 404. Each of the n SYN packets is uniquely identifiable at client 402.

For example, in one implementation, such as when the TCP stack of client 402 is modified with an embodiment, client 402 sends n SYN packets over n outgoing paths—a distinct one of the n SYN packets on a distinct one of the n outgoing paths. Each of the n SYN packets is identifiable by a unique sequence number. The unique sequence numbers can be generated in any suitable manner, including but not limited to generating random numbers that are random or pseudo-random at client 402. Furthermore, without being limited thereto within the scope of the illustrative embodiments, as an example, the sequence number of each of the n SYN packets can be placed in the respective SYN packet in a manner a presently used SYN packet carries a client's initial sequence number in a standard TCP three-way handshake.

As another example, in another implementation, such as when the TCP stack of client 402 remains unmodified but an application or device, e.g., controller 111 in a hypervisor, or v-switch 107, is modified with an embodiment, client 402 causes the sending of n SYN packets over n outgoing paths—a distinct one of the n SYN packets on a distinct one of the n outgoing paths. For example, the TCP stack at client 402 generates one SYN packet with one sequence number, but the modified application creates n copies of the SYN packet, each of the n copies including a unique identifier. The unique identifiers can be generated in any suitable manner, including but not limited to generating random numbers that are random or pseudo-random at the modified application. Furthermore, without being limited thereto within the scope of the illustrative embodiments, as an example, the identifier of each of the n SYN packet copies can be placed in the header of the respective SYN packet copy using some presently unused header field bits.

Hereinafter, the sequence number or the identifier in a SYN packet from client 402 is interchangeably referred to as source identifier, unless specifically distinguished within the context of a particular use. Regardless of the specific implementation, according to an embodiment, in step 406 of modified TCP three-way handshake, n SYN packets with n unique source identifiers 1-through-n originate from client 402 or an application associated therewith, over n distinct outgoing paths from client 402.

To initiate a TCP session, server 404 receives the n SYN packets from client 402 at various times according to the delays in the different paths each SYN packet takes from client 402 to server 404. Server 404 selects that SYN packet from the n SYN packets which arrives first at server 404 with the understanding that the path used by that first arriving SYN packet is the fastest of the n outgoing paths from client 402 to server 404.

Server 404 sends m SYN-ACK packets, one on each of m available outgoing paths from server 404 to client 402 (i.e., m incoming paths at client 402 from server 404, herein after referred to as m incoming paths with reference to client 402). Each of the m SYN-ACK packets is uniquely identifiable at server 404.

For example, in one implementation, such as when the TCP stack of server 404 is modified with an embodiment, server 404 sends m SYN-ACK packets over m incoming paths—a distinct one of the m SYN-ACK packets on a distinct one of the m incoming paths. Each of the m SYN-ACK packets is identifiable by a unique sequence number. The unique sequence numbers can be generated in any suitable manner, including but not limited to generating random numbers that are random or pseudo-random at server 404. Furthermore, without being limited thereto within the scope of the illustrative embodiments, as an example, the sequence number of each of the m SYN-ACK packets can be placed in the respective SYN-ACK packet in a manner a presently used SYN-ACK packet carries a server's initial sequence number in a standard TCP three-way handshake.

As another example, in another implementation, such as when the TCP stack of server 404 remains unmodified but an application or device, e.g., controller 111 in a hypervisor, or v-switch 107, is modified with an embodiment, server 404 causes the sending of m SYN-ACK packets over m incoming paths—a distinct one of the m SYN-ACK packets on a distinct one of the m incoming paths. For example, the TCP stack at server 404 generates one SYN-ACK packet with one sequence number, but the modified application creates m copies of the SYN-ACK packet, each of the m copies including a unique identifier. The unique identifiers can be generated in any suitable manner, including but not limited to generating random numbers that are random or pseudo-random at the modified application. Furthermore, without being limited thereto within the scope of the illustrative embodiments, as an example, the identifier of each of the m SYN-ACK packet copies can be placed in the header of the respective SYN-ACK packet copy using some presently unused header field bits.

Hereinafter, the sequence number or the identifier in a SYN-ACK packet from server 404 is interchangeably referred to as destination identifier, unless specifically distinguished within the context of a particular use. Regardless of the specific implementation, according to an embodiment, in step 408 of modified TCP three-way handshake, m SYN-ACK packets with m unique destination identifiers 1-through-m originate from server 404 or an application associated therewith, over m distinct incoming paths to client 402.

The ACK portion of each of the m SYN-ACK packet is responsive to the source identifier of the first arriving SYN packet from client 402. Without implying a limitation thereto, in one example embodiment, each of the m SYN-ACK packets carries the source identifier, or a constant increment thereof, of the first arriving SYN packet in a manner similar to a presently used SYN-ACK packet is responsive to a SYN packet in the standard TCP three-way handshake. For example, each of the m SYN-ACK packets may carry in the ACK portion, the value (source identifier value of the first arriving SYN packet+1).

Client 402 receives the m SYN-ACK packets from server 404 at various times according to the delays in the different paths each SYN-ACK packet takes from server 404 to client 402. Client 402 selects that SYN-ACK packet from the m SYN-ACK packets which arrives first at client 402 with the understanding that the path used by that first arriving SYN-ACK packet is the fastest of the m incoming paths from server 404 to client 402.

In step 410 of the modified three-way handshake, client 402 or an application associated therewith sends one ACK packet to server 404. In step 410, client 402 selects that outgoing path for the ACK packet which the first arriving SYN packet took to arrive at server 404. That outgoing path is identifiable at client 402 because the SYN-ACK packets identify that SYN packet in the ACK portion. Client 402 or an application associated therewith keeps track of the source identifiers of each of the n SYN packets and the respective outgoing paths they took.

The ACK packet of step 410 is responsive to the destination identifier of the first arriving SYN-ACK packet from server 404. Without implying a limitation thereto, in one example embodiment, the ACK packet carries the destination identifier, or a constant increment thereof, of the first arriving SYN-ACK packet in a manner similar to a presently used ACK packet is responsive to a SYN-ACK packet in the standard TCP three-way handshake. For example, the ACK packet may carry the value (destination identifier value of the first arriving SYN-ACK packet+1).

Thus, server 404 is synchronized with client 402 on the source identifier associated with the fastest available outgoing path from client 402. Similarly, client 402 is synchronized with server 404 on the destination identifier associated with the fastest available incoming path from server 404. Client 402 and server 404 thus establish a TCP session over the fastest outgoing and incoming paths available at the time of establishing the TCP session. Note that client 402 or a component thereof is responsible for selecting the fastest outgoing path from client 402, whereas server 404 or a component thereof is responsible for selecting the fastest incoming path to client 402.

Figure 5:
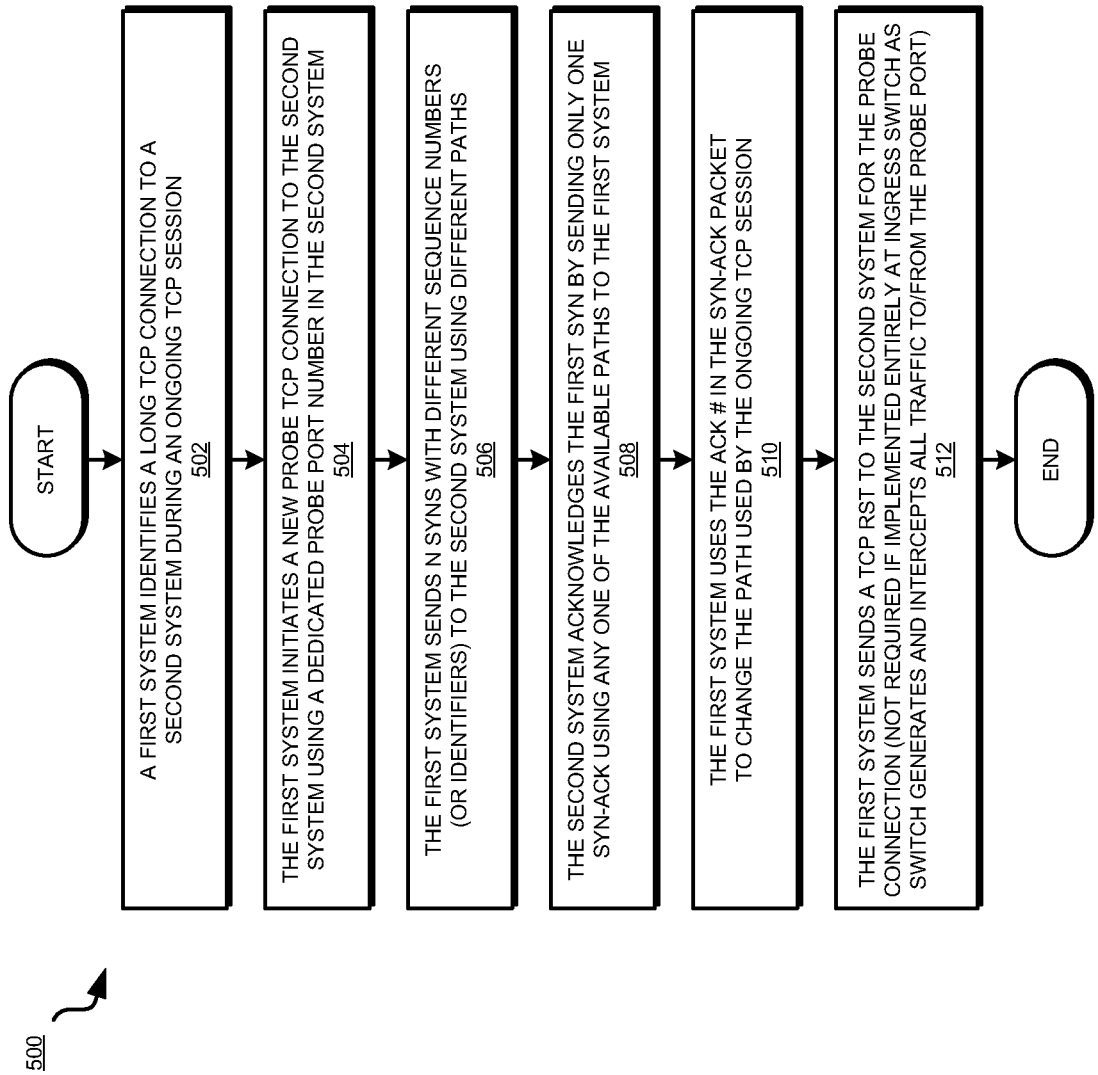
FIG. 5 depicts a process of changing a path used in an ongoing TCP session in accordance with an illustrative embodiment.

With reference to FIG. 5, this figure depicts a process of changing a path used in an ongoing TCP session in accordance with an illustrative embodiment. Process 500 can be implemented in application 105 alone, or in combination with v-switch 107, controller 111, or TCP stack 113 of FIG. 1.

Assume that a first system, e.g., client 402 in FIG. 4, and a second system, e.g., server 404 in FIG. 4, are engaged in an ongoing TCP session using certain incoming and outgoing paths to and from the first system. Further assume that at some point during the session, the TCP connection performance deteriorates, such as when communication over the connection takes longer than a threshold amount of time. The first system and the second system each have associated therewith an instance of the application implementing an embodiment, to manage the TCP connection.

During the ongoing TCP session, an instance of the application at the first system (the first application) identifies that the TCP connection is taking longer than the threshold amount of time (block 502). The first application initiates a new TCP session with the second system (block 504). In the manner of step 406 in FIG. 4, the first application sends n SYN packets containing n unique source identifiers over then-available n outgoing paths from first system to the second system (block 506).

An instance of the application associated with the second system (the second application) receives the n SYN packets at different times due to the delays in their respective paths. The second application acknowledges the first arriving SYN packet by sending only one SYN-ACK packet corresponding to the first arriving SYN packet on any available incoming path to the first system (block 508).

The first application receives the SYN-ACK packet from the second application. The first application identifies the SYN packet from the SYN-ACK packet using the source identifier or a constant increment thereof in the ACK portion of the SYN-ACK in the manner described in FIG. 4 (block 510). Accordingly, the first application identifies the new fastest outgoing path that was taken by that SYN packet to arrive first at the second application.

The first application changes the outgoing path currently in use in the ongoing TCP session to the new fastest outgoing path in block 510. The first application ends the new TCP session initiated in block 504 (block 512). The first application ends process 500 thereafter.

Thus an embodiment uses a modified two-way handshake (only SYN and SYN-ACK using multiple SYN packets and one SYN-ACK packet) to identify and change-over to a new fastest path during an ongoing TCP session. In one embodiment, the first application initiates the new TCP session in the form of a new TCP probe connection using a dedicated probe port number in the second system. In such a case, the first application sends a reset to the second application for the probe connection in block 512.

In certain circumstances, such as when the first application and the second application are implemented such that the TCP stacks of the first system and the second system remain unchanged, the TCP reset of block 512 can be omitted without departing the scope of the illustrative embodiments.

Figure 6:
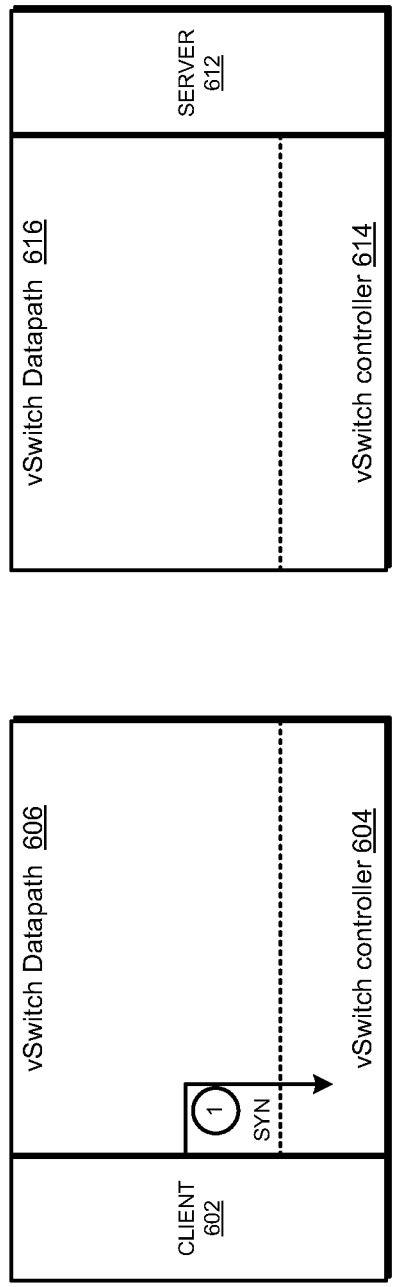
FIG. 6 depicts a step in an example process of path selection using TCP handshake in a multipath environment using a modified hypervisor v-switch or a modified controller in accordance with an illustrative embodiment.

With reference to FIG. 6, this figure depicts a step in an example process of path selection using TCP handshake in a multipath environment using a modified hypervisor v-switch or a modified controller in accordance with an illustrative embodiment. Data processing system 602 is an example of node 1 302 in FIG. 3, or data processing system 402 in FIG. 4. Data processing system 602 is represented as a client only as an example without implying any limitation to such a role. Data processing system 612 is an example of node 2 304 in FIG. 3, or data processing system 404 in FIG. 4. Data processing system 612 is represented as a client only as an example without implying any limitation to such a role.

A v-switch associated with client 602 manages the TCP connections in which client 602 participates. An example configuration of the v-switch associated with client 602 comprises v-switch controller component 604, which is modified using an embodiment, and a v-switch datapath component 606. V-switch controller 604 facilitates the path selection during the TCP connection establishment and the changing over of communication paths in ongoing TCP connections. Once a TCP connection is established, v-switch datapath 606 facilitates the ongoing communications by forwarding packets based on the forwarding path rules configured by the v-switch controller.

A v-switch associated with server 612 manages the TCP connections in which server 612 participates. An example configuration of the v-switch associated with server 612 comprises v-switch controller component 614, which is modified using an embodiment, and a v-switch datapath component 616. V-switch controller 614 facilitates the path selection during the TCP connection establishment and the changing over of communication paths in ongoing TCP connections. Once a TCP connection is established, v-switch datapath 616 facilitates the ongoing communications by forwarding packets based on the forwarding path rules configured by the v-switch controller.

Client 602 initiates a TCP session, for example, upon a request from an application executing thereon to the TCP stack of client 602 to initiate a TCP session with server 612. Accordingly, client 602, by way of the TCP stack implemented therein sends a SYN packet to v-switch (step 1). V-switch datapath 606 currently has no rules configured to forward packets belonging to this flow and hence the packet is forwarded to the v-switch controller. V-switch controller 604 receives the SYN packet.

Figure 7:
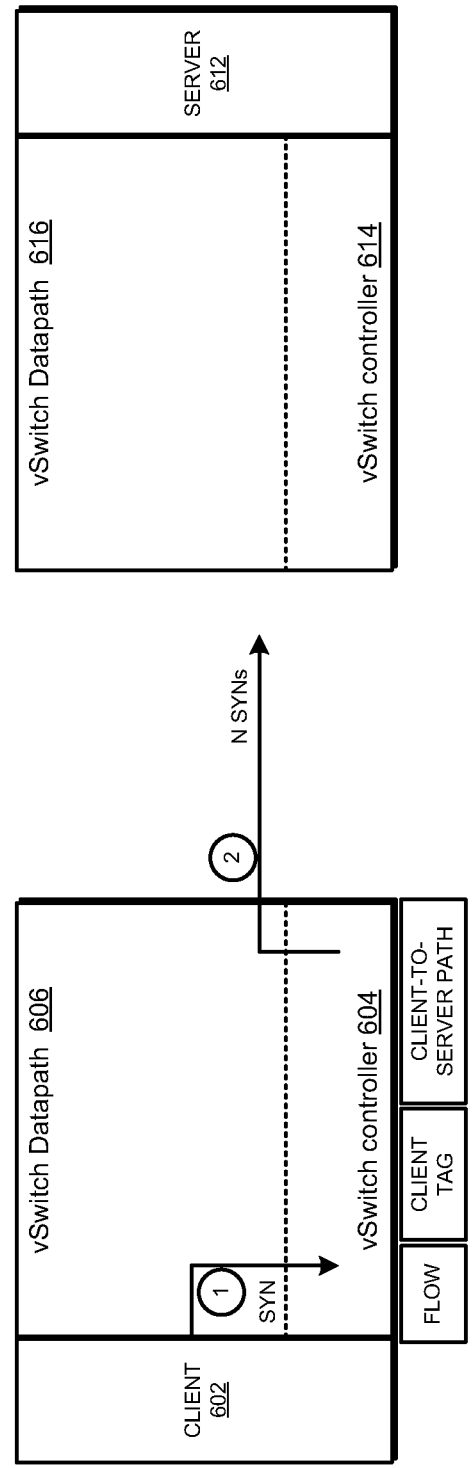
FIG. 7 depicts another step in an example process of path selection using TCP handshake in a multipath environment using a modified v-switch or a modified controller in accordance with an illustrative embodiment.

With reference to FIG. 7, this figure depicts another step in an example process of path selection using TCP handshake in a multipath environment using a modified v-switch or a modified controller in accordance with an illustrative embodiment. V-switch controller 604 replicates the SYN packet in to n SYN packets for n outgoing paths.

V-switch controller 604 tags each of the n SYN packets with a unique source identifier, such as by modifying certain bits in each SYN packet to contain a unique identifier, e.g., a random number in the lower 6 bits of the VLAN field in each of the n SYN packets. A source identifier is also referred to as a tag, e.g., a client tag when the source is a client. V-switch controller 604 sends the n SYN packets to server 612 over n outgoing paths (step 2).

With reference to FIG. 8, this figure depicts another step in an example process of path selection using TCP handshake in a multipath environment using a modified v-switch or a modified controller in accordance with an illustrative embodiment. V-switch controller 614 receives the n SYN packets at different times over the n outgoing paths from client 602 to server 612 (step 3).

With reference to FIG. 9, this figure depicts another step in an example process of path selection using TCP handshake in a multipath environment using a modified v-switch or a modified controller in accordance with an illustrative embodiment. V-switch controller 614 extracts the source identifier from the first arriving SYN packet. V-switch controller 614 forwards the first arriving SYN packet to server 612 (step 4). V-switch controller 614 drops, discards, or otherwise ignores the remaining (n–1) SYN packets that arrive after the first arriving SYN packet.

Figure 10:
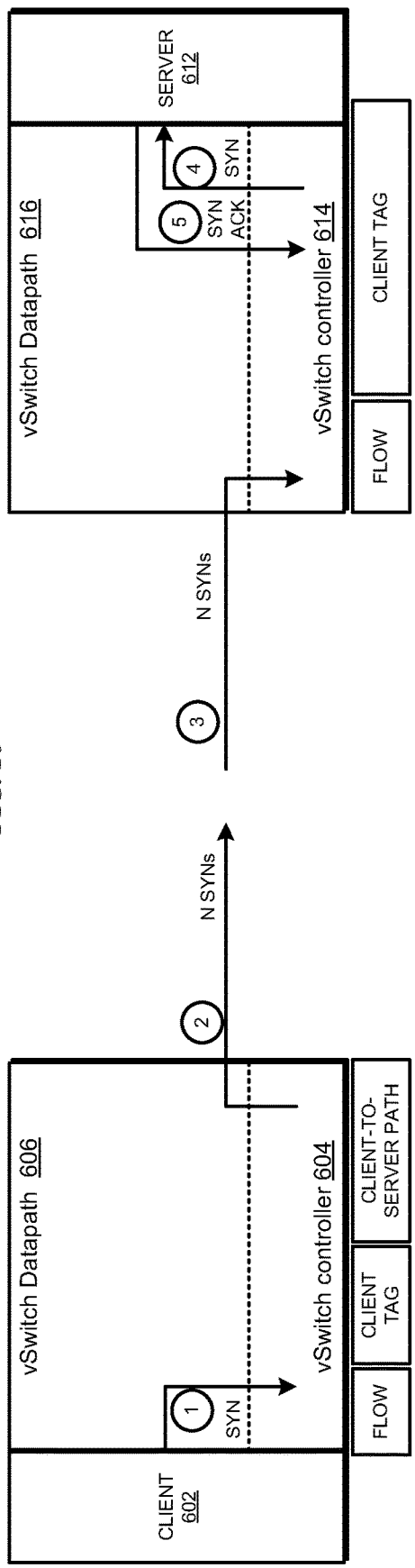
FIG. 10 depicts another step in an example process of path selection using TCP handshake in a multipath environment using a modified v-switch or a modified controller in accordance with an illustrative embodiment.

With reference to FIG. 10, this figure depicts another step in an example process of path selection using TCP handshake in a multipath environment using a modified v-switch or a modified controller in accordance with an illustrative embodiment. Server 612, or a TCP stack implemented therein, sends a SYN-ACK packet which is forwarded to v-switch controller 614 (step 5).

Figure 11:
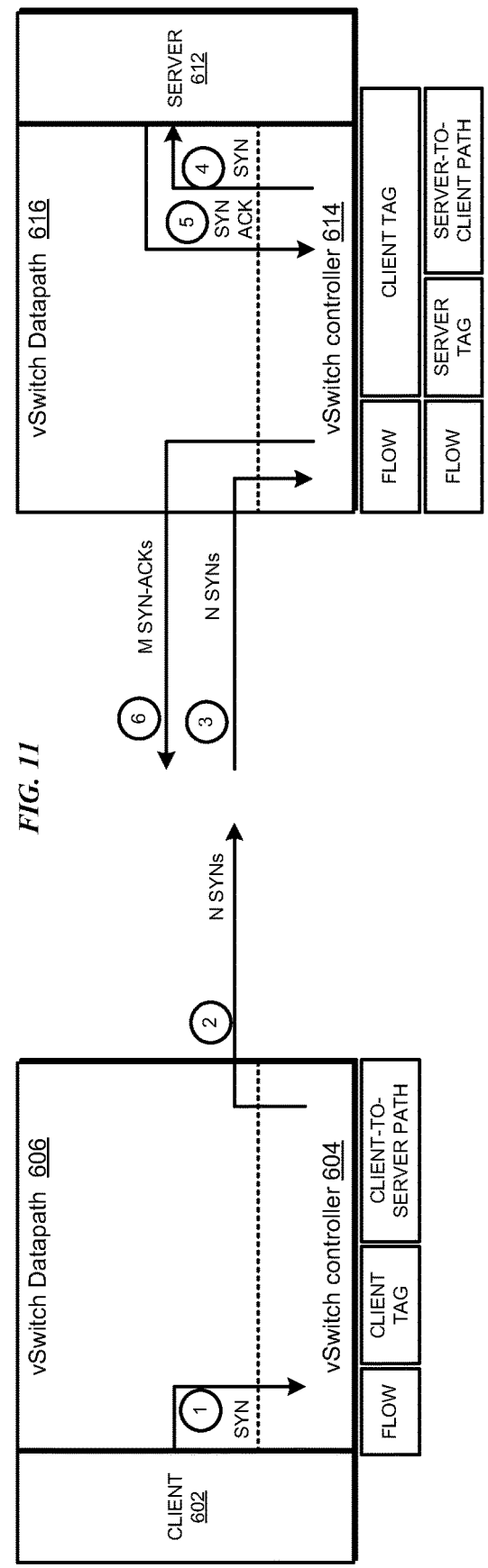
FIG. 11 depicts another step in an example process of path selection using TCP handshake in a multipath environment using a modified v-switch or a modified controller in accordance with an illustrative embodiment.

With reference to FIG. 11, this figure depicts another step in an example process of path selection using TCP handshake in a multipath environment using a modified v-switch or a modified controller in accordance with an illustrative embodiment. V-switch controller 614 replicates the SYN-ACK packet in to m SYN-ACK packets for m incoming paths from server 612 to client 602.

V-switch controller 614 tags each of the m SYN-ACK packets with a unique destination identifier, such as by modifying certain bits in each SYN-ACK packet to contain a unique identifier, e.g., a random number in the upper 6 bits of the VLAN field in each of the m SYN-ACK packets. A destination identifier is also referred to as a tag, e.g., a server tag when the destination is a server. V-switch controller also tags each SYN-ACK packet to contain the previously extracted source identifier, e.g., in the lower 6 bits of the VLAN field in each of the m SYN-ACK packets. V-switch controller 614 sends the m SYN-ACK packets to client 602 over m incoming paths (step 6).

Figure 12:
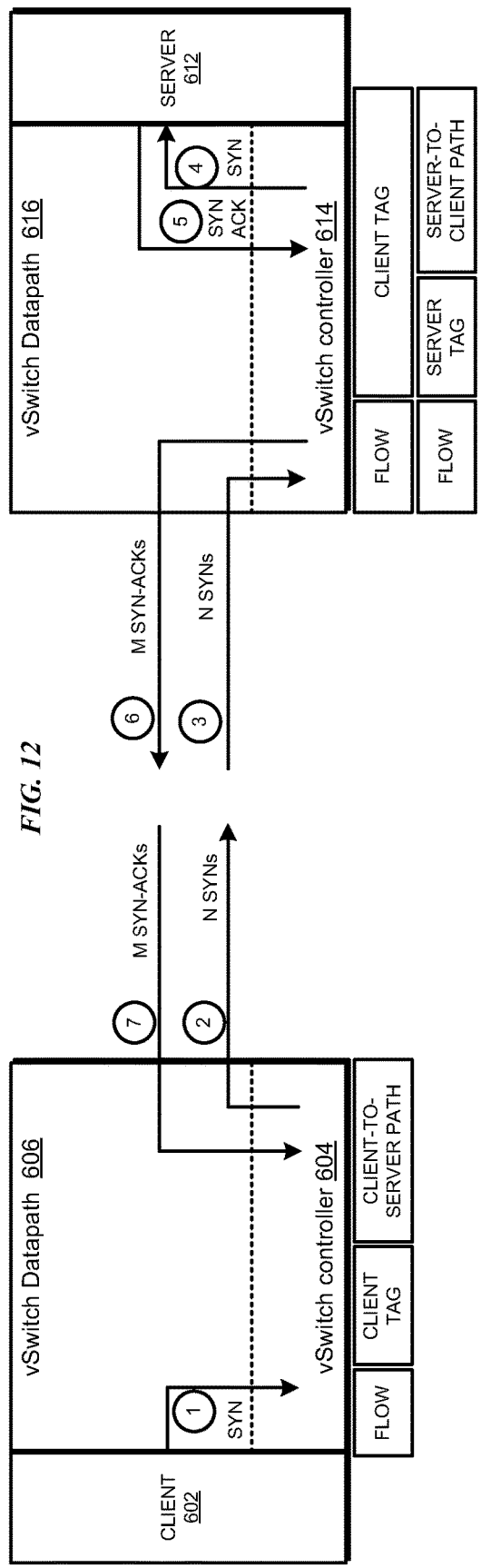
FIG. 12 depicts another step in an example process of path selection using TCP handshake in a multipath environment using a modified v-switch or a modified controller in accordance with an illustrative embodiment.

With reference to FIG. 12, this figure depicts another step in an example process of path selection using TCP handshake in a multipath environment using a modified v-switch or a modified controller in accordance with an illustrative embodiment. V-switch controller 604 receives the m SYN-ACK packets at different times over the m incoming paths from server 612 to client 602 (step 7).

Figure 13:
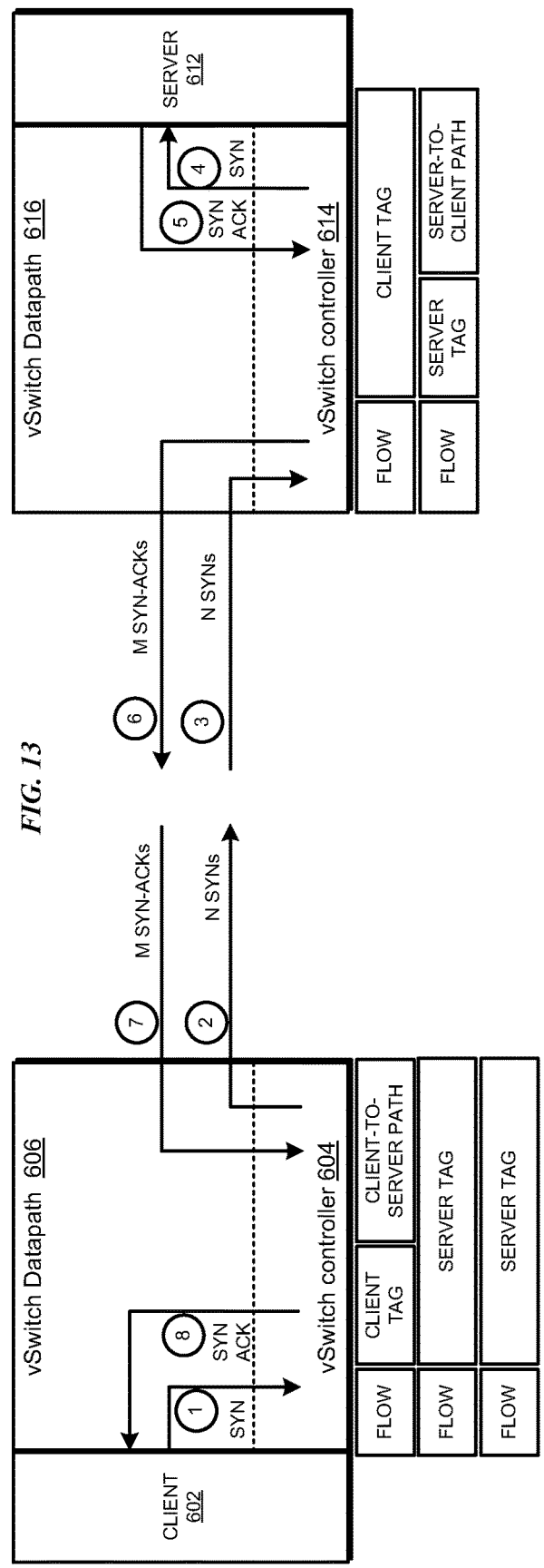
FIG. 13 depicts another step in an example process of path selection using TCP handshake in a multipath environment using a modified v-switch or a modified controller in accordance with an illustrative embodiment.

With reference to FIG. 13, this figure depicts another step in an example process of path selection using TCP handshake in a multipath environment using a modified v-switch or a modified controller in accordance with an illustrative embodiment. V-switch controller 604 extracts the source identifier (or an increment thereof) and the destination identifier from the first arriving SYN-ACK packet. V-switch controller 604 forwards the first arriving SYN-ACK packet to client 602 (step 8). V-switch controller 604 drops, discards, or otherwise ignores the remaining (m–1) SYN-ACK packets that arrive after the first arriving SYN-ACK packet. V-switch controller 604 associates the outgoing path corresponding to the source identifier (or an increment thereof) in the SYN-ACK packet with the TCP session to be established.

Figure 14:
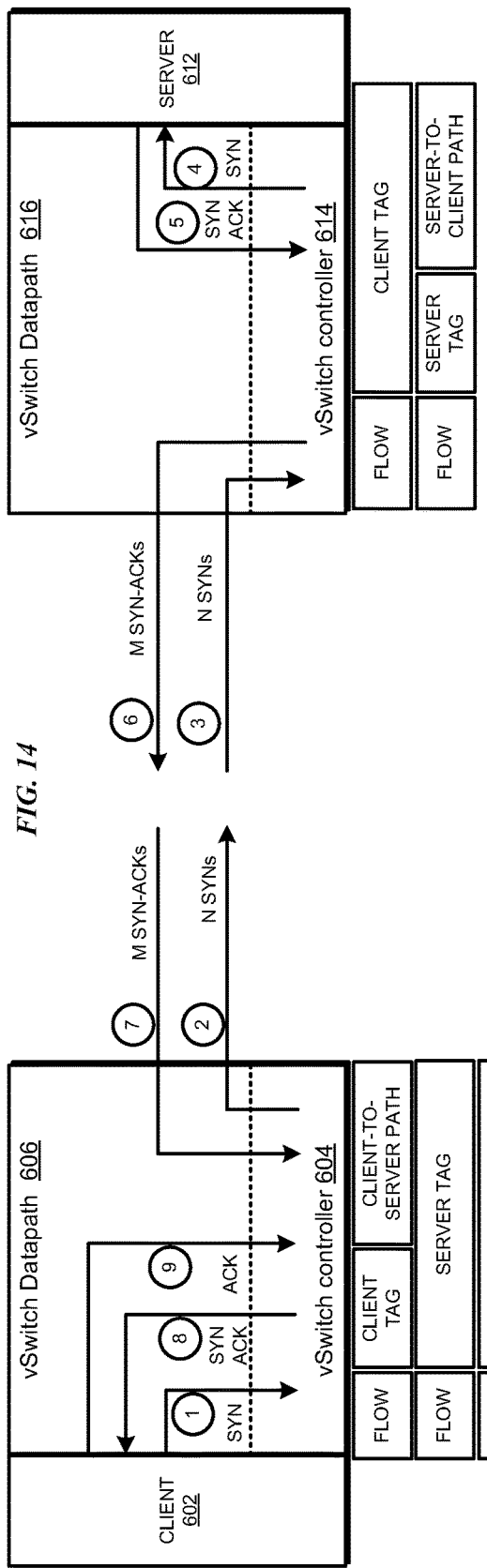
FIG. 14 depicts another step in an example process of path selection using TCP handshake in a multipath environment using a modified v-switch or a modified controller in accordance with an illustrative embodiment.

With reference to FIG. 14, this figure depicts another step in an example process of path selection using TCP handshake in a multipath environment using a modified v-switch or a modified controller in accordance with an illustrative embodiment. Client 602, or a TCP stack implemented therein, sends a single ACK packet, which is forwarded to v-switch controller 604 (step 9).

Figure 15:
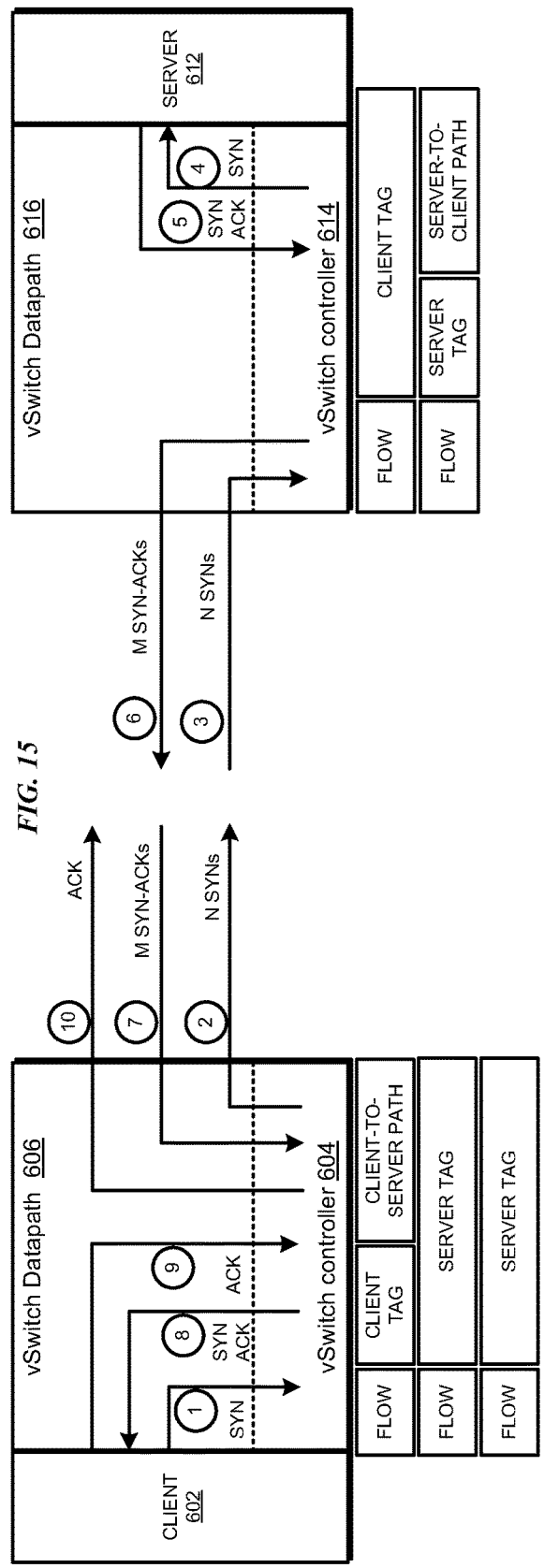
FIG. 15 depicts another step in an example process of path selection using TCP handshake in a multipath environment using a modified v-switch or a modified controller in accordance with an illustrative embodiment.

With reference to FIG. 15, this figure depicts another step in an example process of path selection using TCP handshake in a multipath environment using a modified v-switch or a modified controller in accordance with an illustrative embodiment. V-switch controller 604 programs the TCP connection path between client 602 and server 612 in v-switch datapath 606 to use the outgoing path corresponding to the extracted source identifier. V-switch controller 604 sends the ACK packet to server 612 by using the selected outgoing path (step 10). The ACK packet corresponds to the first arriving SYN-ACK packet by including the destination identifier in that SYN-ACK packet or an increment of that destination identifier.

Figure 16:
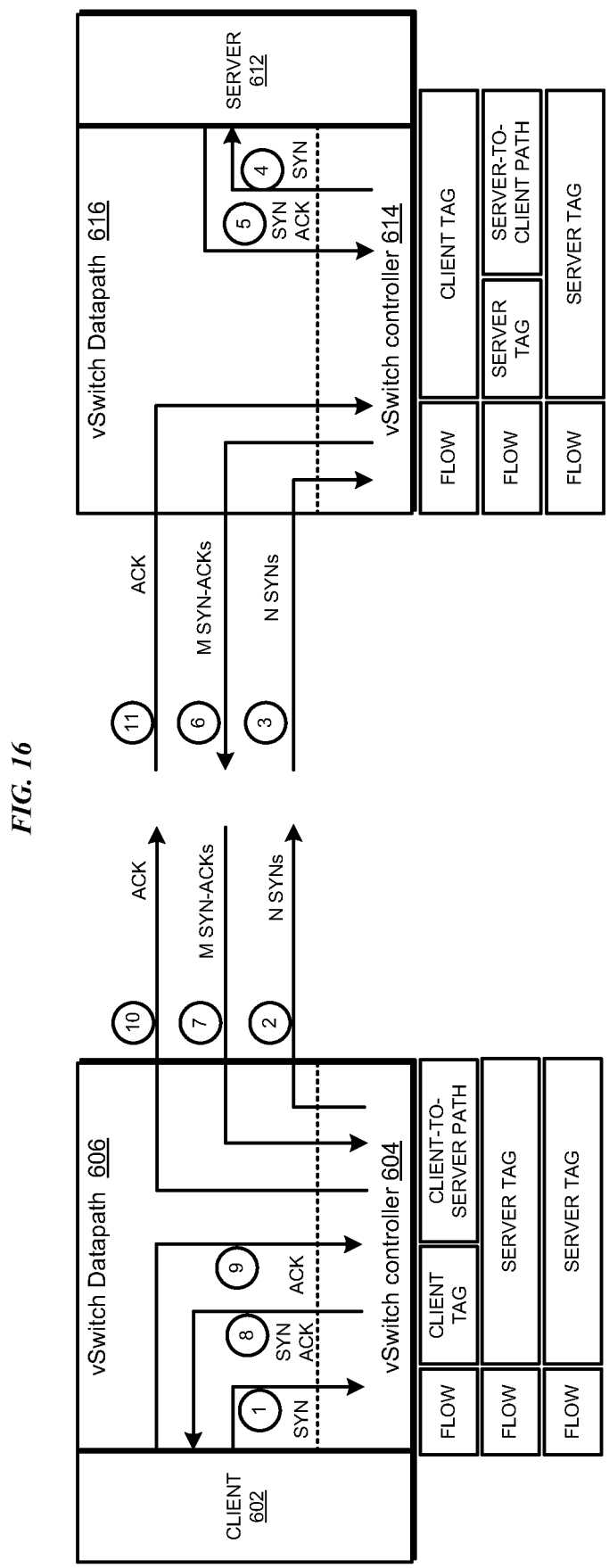
FIG. 16 depicts another step in an example process of path selection using TCP handshake in a multipath environment using a modified v-switch or a modified controller in accordance with an illustrative embodiment.

With reference to FIG. 16, this figure depicts another step in an example process of path selection using TCP handshake in a multipath environment using a modified v-switch or a modified controller in accordance with an illustrative embodiment. V-switch controller 614 receives the ACK packet from client 602 (step 11). V-switch controller 614 associates the incoming path corresponding to the destination identifier (or an increment thereof) in the ACK packet with the TCP session to be established. V-switch controller 614 programs the TCP connection path between server 612 and client 602 in v-switch datapath 616 to use the incoming path corresponding to the extracted destination identifier.

Figure 17:
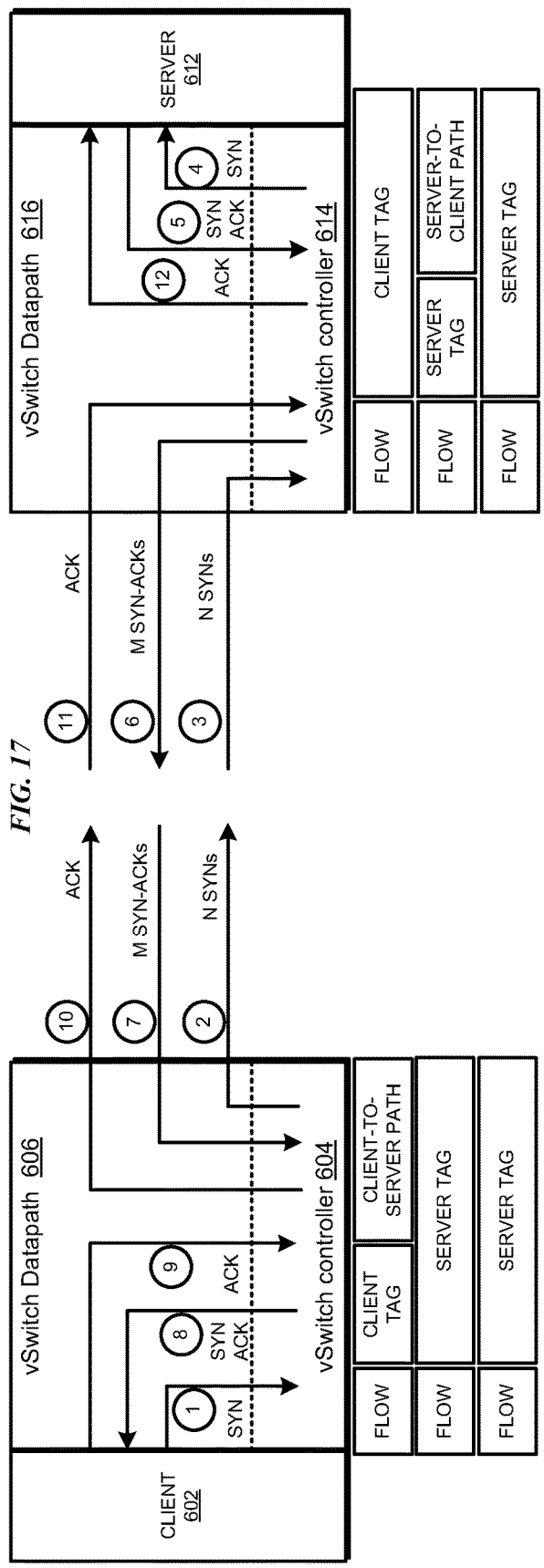
FIG. 17 depicts another step in an example process of path selection using TCP handshake in a multipath environment using a modified v-switch or a modified controller in accordance with an illustrative embodiment.

With reference to FIG. 17, this figure depicts another step in an example process of path selection using TCP handshake in a multipath environment using a modified v-switch or a modified controller in accordance with an illustrative embodiment. V-switch controller 614 forwards the ACK packet to server 612 (step 12). The modified three-way handshake according to an embodiment is completed.

Figure 18:
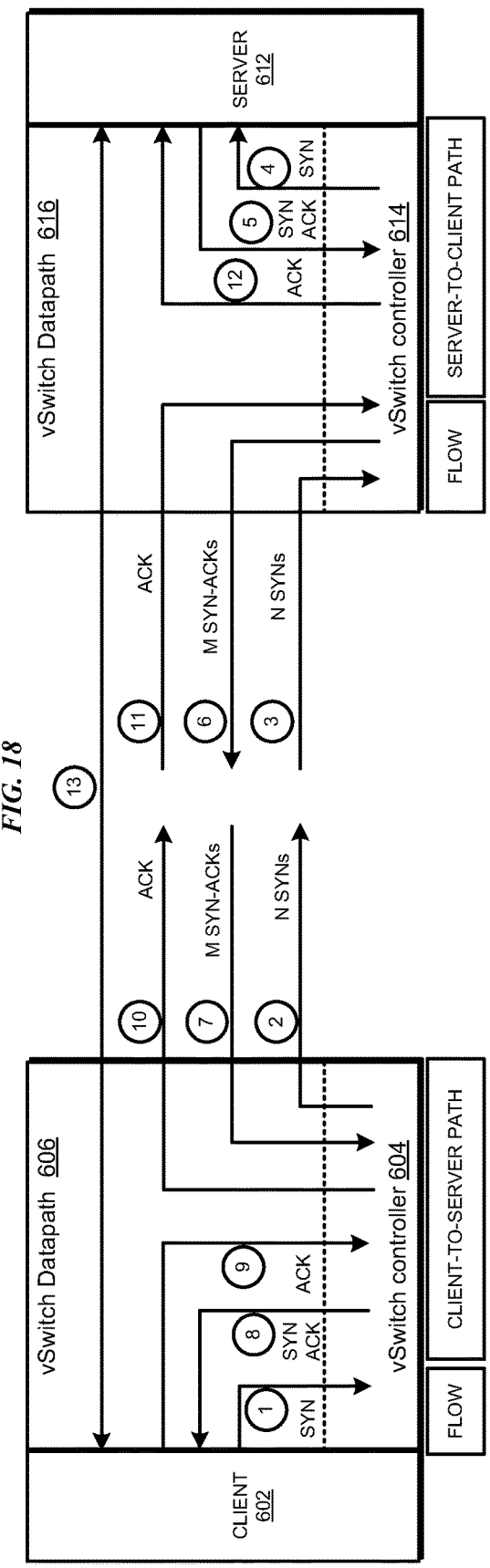
FIG. 18 depicts another step in an example process of path selection using TCP handshake in a multipath environment using a modified v-switch or a modified controller in accordance with an illustrative embodiment.

With reference to FIG. 18, this figure depicts another step in an example process of path selection using TCP handshake in a multipath environment using a modified v-switch or a modified controller in accordance with an illustrative embodiment. Once v-switch controllers 604 and 614 have transferred the established path information to v-switch datapaths 606 and 616, respectively, the subsequent packets belonging to the same flow are not sent to the v-switch controllers. Client 602 and server 612 can now communicate via fast v-switch datapath 606 and v-switch datapath 616 using the established outgoing and incoming paths (step 13).

Figure 19:
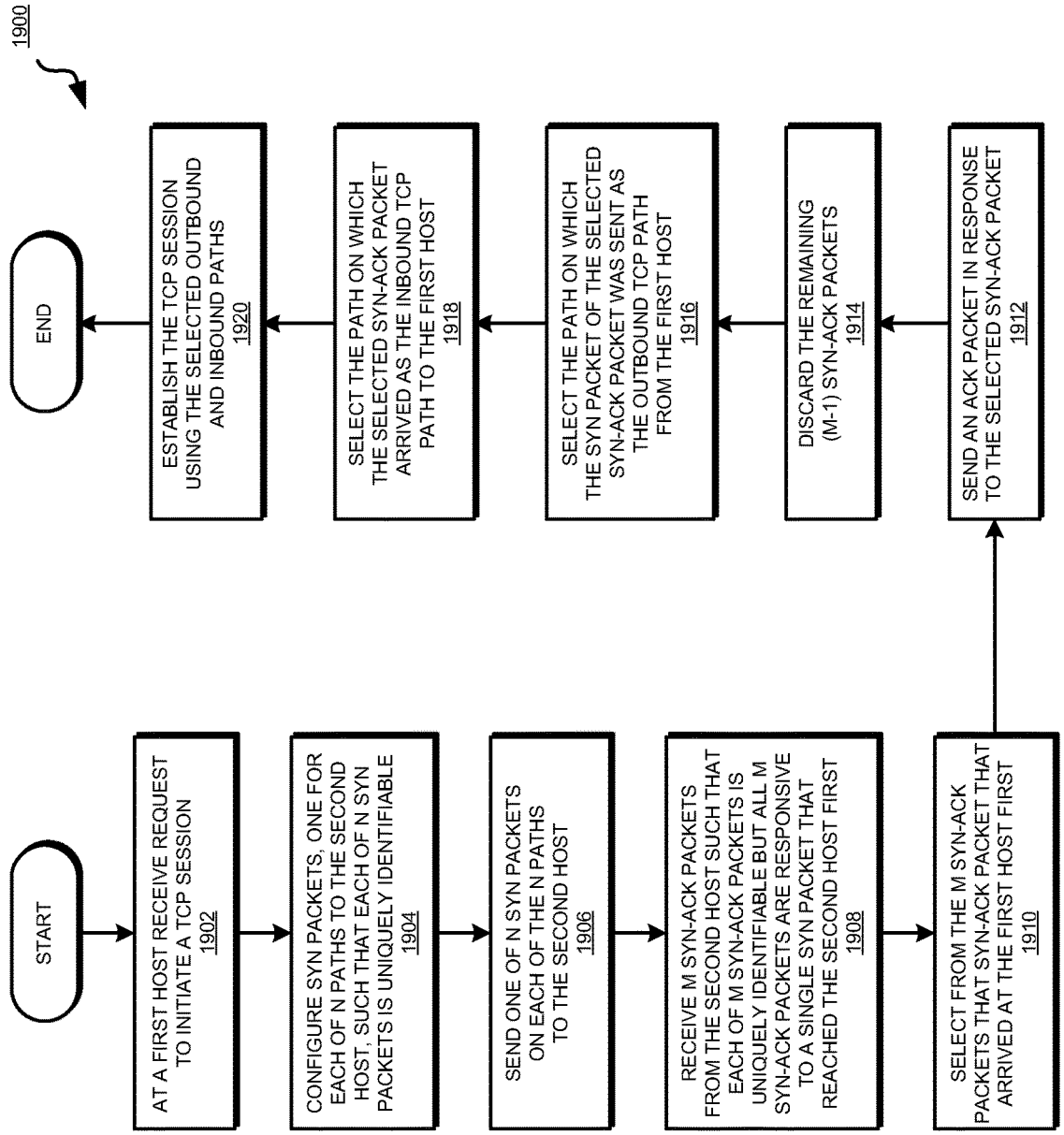
FIG. 19 depicts a flowchart of an example process for path selection using TCP handshake in a multipath environment in accordance with an illustrative embodiment.

With reference to FIG. 19, this figure depicts a flowchart of an example process for path selection using TCP handshake in a multipath environment in accordance with an illustrative embodiment. Process 1900 can be implemented in an application, such as in v-switch controller 604 in FIG. 18.

The application, at a first host, such as at client 602 in FIG. 18, receives a request to initiate a TCP session with a second host, such as server 612 in FIG. 18 (block 1902). The application configures n SYN packets, one for each of n routes or paths to the second host, such that each SYN packet is uniquely identifiable (block 1904). The application sends a different one of n SYN packets on each of the n paths to the second host (block 1906).

The application receives m SYN-ACK packets from the second host such that each of the m SYN-ACK packets is uniquely identifiable but all m SYN-ACK packets are responsive to a single SYN packet that reached the second host first (block 1908). The application select from the m SYN-ACK packets that SYN-ACK packet which arrived at the first host first (block 1910).

The application sends an ACK packet in response to the selected SYN-ACK packet (block 1912). The application discards or otherwise ignores the remaining (m–1) SYN-ACK packets that arrive later than the first arriving SYN-ACK packet (block 1914).

The application selects the path on which the SYN packet corresponding to the selected SYN-ACK packet was sent as the outbound TCP path from the first host (block 1916). Another application, at a second host, such as at server 612 in FIG. 18, selects the path, on which the selected SYN-ACK packet was sent, as the inbound TCP path to the first host (block 1918).

The application establishes the requested TCP session using the selected outbound and inbound paths (block 1920). The application ends process 1900 thereafter.

Figure 20:
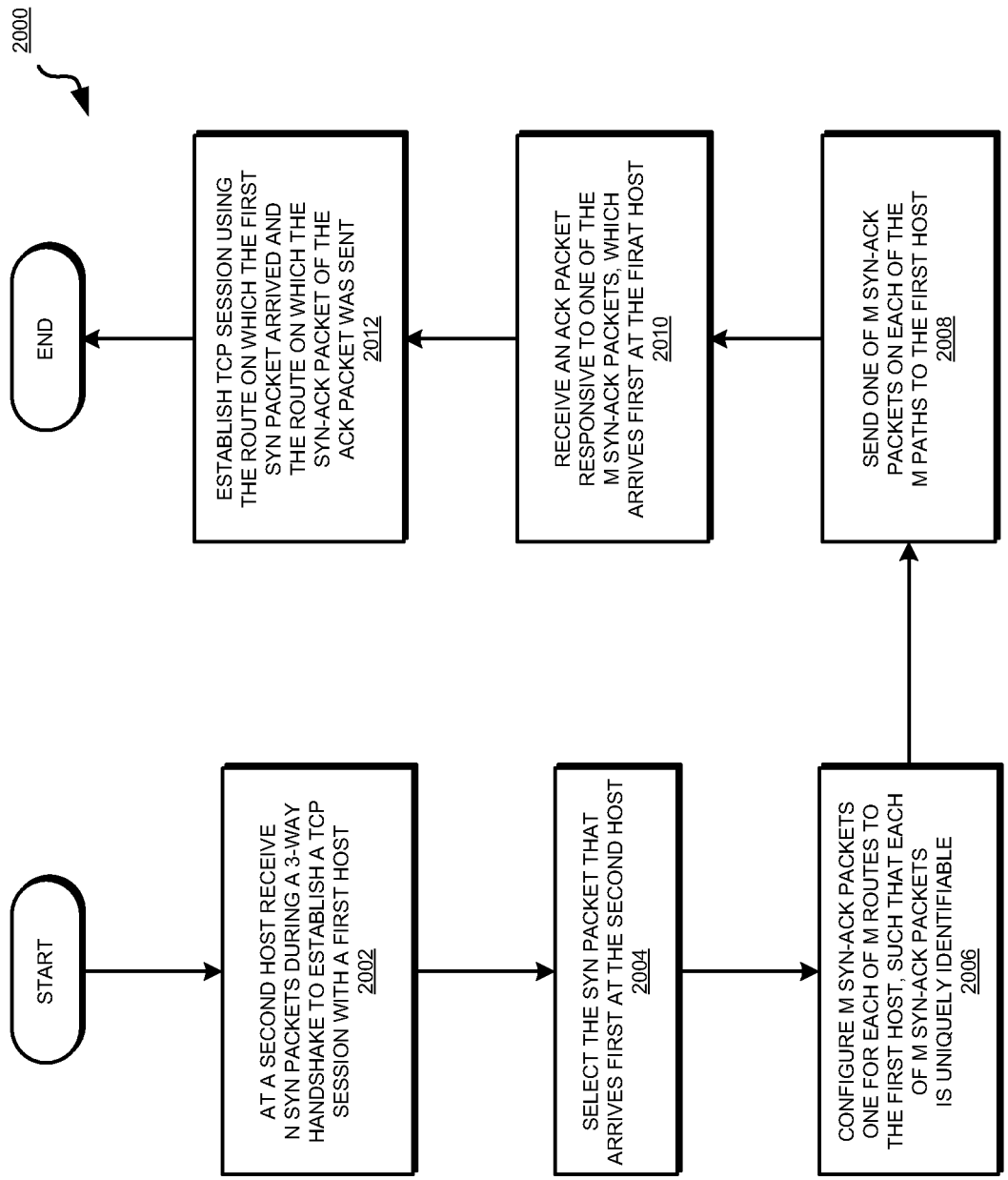
FIG. 20 depicts a flowchart of another example process for path selection using TCP handshake in a multipath environment in accordance with an illustrative embodiment.

With reference to FIG. 20, this figure depicts a flowchart of another example process for path selection using TCP handshake in a multipath environment in accordance with an illustrative embodiment. Process 2000 can be implemented in an application, such as in v-switch controller 614 in FIG. 18.

The application, at a second host, such as at server 612 in FIG. 18, receives some or all of n SYN packets sent in block 1906 of FIG. 19, during a modified three-way handshake to establish a TCP session with a first host, such as client 602 in FIG. 18(block 2002).

The application selects from the n SYN packets that SYN packet which arrived at the second host first (block 2004). The application configures m SYN-ACK packets, one for each of m routes or paths to the first host, such that each SYN-ACK packet is uniquely identifiable (block 2006). The application sends a different one of m SYN-ACK packets on each of the m paths to the first host (block 2008).

The application receives an ACK packet in response to one of the m SYN-ACK packets that arrives first at the first host (block 2010). The application selects the path on which the SYN packet selected in block 2004 arrived, the path on which the SYN-ACK packet corresponding to the ACK packet was sent, and establishes the requested TCP session using the selected paths (block 2012). The application ends process 2000 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for path selection using TCP handshake in a multipath environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for path selection using TCP handshake in a multipath environment, the method comprising:
   sending, from a first application executing using a processor and a memory in a first data processing system, a plurality of SYN packets, wherein each of the plurality of SYN packets traverses a different path in a first set of paths between the first data processing system and a second data processing system in a multipath data communication network, each of the plurality of SYN packets including a corresponding unique source identifier;
   selecting, at the first application, from a plurality of SYN-ACK packets, a SYN-ACK packet, wherein the selected SYN-ACK packet is first to arrive at the first application as compared to other SYN-ACK packets in the plurality of SYN-ACK packets, wherein each SYN-ACK packet in the plurality of SYN-ACK packets includes a unique source identifier of a selected SYN packet in the plurality of SYN packets;
   configuring a path from the first set of paths, corresponding to the selected SYN packet, as an outbound path from the first data processing system;
   configuring a path from a second set of paths, corresponding to the selected SYN-ACK packet, as an inbound path to the first data processing system;
   sending, in response to selecting the selected SYN-ACK packet, an ACK packet from the first application, wherein the ACK packet includes a unique source identifier of the selected SYN-ACK packet in the plurality of SYN-ACK packets, wherein the ACK packet is sent on the outbound path; and
   establishing a Transport Control Protocol (TCP) session between the first data processing system and the second data processing system using the outbound path and the inbound path.

2. The method of claim 1, further comprising:
   detecting, during the TCP session, a delay in TCP communication exceeds a threshold delay;
   sending, from the first application, a second plurality of SYN packets, wherein each of the second plurality of SYN packets traverses a different path in a third set of paths between the first data processing system and the second data processing system in the multipath data communication network, each of the second plurality of SYN packets including a corresponding unique source identifier;
   determining, at the first application, from a second SYN-ACK packet, a unique source identifier of a second selected SYN packet to which the second SYN-ACK packet is responsive;
   configuring a path from the third set of paths, corresponding to the second selected SYN packet, as a new outbound path from the first data processing system; and
   reconfiguring the TCP session to use the new outbound path.

3. The method of claim 1, further comprising:
   sending an ACK packet to the second data processing system, wherein the ACK packet is responsive to the selected SYN-ACK packet.

4. The method of claim 1, wherein each SYN-ACK packet in the plurality of SYN-ACK packets includes a unique destination identifier.

5. The method of claim 1, further comprising:
   recording a correspondence between a SYN packet and a path in the first set of paths.

6. The method of claim 5, further comprising:
   recording a unique source identifier included in the SYN packet.

7. The method of claim 1, wherein a delay associated with one path in the first set of paths causes a corresponding SYN packet to be delayed in arriving at the second data processing system differently than another SYN packet corresponding to another path in the first set of paths.

8. The method of claim 1, wherein the selected SYN packet is the first to arrive at a second application executing in the second data processing system as compared to other SYN packets in the plurality of SYN packets.

9. The method of claim 1, wherein each SYN-ACK packet in the plurality of SYN-ACK packets traverses a different path in the second set of paths between the second data processing system and the first data processing system in the multipath data communication network.

10. The method of claim 9, wherein a delay associated with one path in the second set of paths causes a corresponding SYN-ACK packet to be delayed in arriving at the first application differently than another SYN-ACK packet corresponding to another path in the second set of paths.

11. The method of claim 1, wherein a path in the first set of paths and a path in the second set of paths partially overlap each other.

12. A computer usable program product comprising a computer readable storage device including computer usable code for path selection using TCP handshake in a multipath environment, the computer usable code comprising:
   computer usable code for sending, from a first application executing using a processor and a memory in a first data processing system, a plurality of SYN packets, wherein each of the plurality of SYN packets traverses a different path in a first set of paths between the first data processing system and a second data processing system in a multipath data communication network, each of the plurality of SYN packets including a corresponding unique source identifier;
   computer usable code for selecting, at the first application, from a plurality of SYN-ACK packets, a SYN-ACK packet, wherein the selected SYN-ACK packet is first to arrive at the first application as compared to other SYN-ACK packets in the plurality of SYN-ACK packets, wherein each SYN-ACK packet in the plurality of SYN-ACK packets includes a unique source identifier of a selected SYN packet in the plurality of SYN packets;
   computer usable code for configuring a path from the first set of paths, corresponding to the selected SYN packet, as an outbound path from the first data processing system;
   computer usable code for configuring a path from a second set of paths, corresponding to the selected SYN-ACK packet, as an inbound path to the first data processing system;
   computer usable code for sending, in response to selecting the selected SYN-ACK packet, an ACK packet from the first application, wherein the ACK packet includes a unique source identifier of the selected SYN-ACK packet in the plurality of SYN-ACK packets, wherein the ACK packet is sent on the outbound path; and
   computer usable code for establishing a Transport Control Protocol (TCP) session between the first data processing system and the second data processing system using the outbound path and the inbound path.

13. The computer usable program product of claim 12, further comprising:
   computer usable code for detecting, during the TCP session, a delay in TCP communication exceeds a threshold delay;
   computer usable code for sending, from the first application, a second plurality of SYN packets, wherein each of the second plurality of SYN packets traverses a different path in a third set of paths between the first data processing system and the second data processing system in the multipath data communication network, each of the second plurality of SYN packets including a corresponding unique source identifier;
   computer usable code for determining, at the first application, from a second SYN-ACK packet, a unique source identifier of a second selected SYN packet to which the second SYN-ACK packet is responsive;
   computer usable code for configuring a path from the third set of paths, corresponding to the second selected SYN packet, as a new outbound path from the first data processing system; and
   computer usable code for reconfiguring the TCP session to use the new outbound path.

14. The computer usable program product of claim 12, further comprising:
   computer usable code for sending an ACK packet to the second data processing system, wherein the ACK packet is responsive to the selected SYN-ACK packet.

15. The computer usable program product of claim 12, wherein each SYN-ACK packet in the plurality of SYN-ACK packets includes a unique destination identifier.

16. The computer usable program product of claim 12, further comprising:
   computer usable code for recording a correspondence between a SYN packet and a path in the first set of paths.

17. The computer usable program product of claim 16, further comprising:
   computer usable code for recording a unique source identifier included in the SYN packet.

18. The computer usable program product of claim 12, wherein the computer usable code is stored in a computer readable storage medium in a data processing system, and wherein the computer usable code is transferred over a network from a remote data processing system.

19. The computer usable program product of claim 12, wherein the computer usable code is stored in a computer readable storage medium in a server data processing system, and wherein the computer usable code is downloaded over a network to a remote data processing system for use in a computer readable storage medium associated with the remote data processing system.

20. A data processing system for path selection using TCP handshake in a multipath environment, the data processing system comprising:
   a storage device including a storage medium, wherein the storage device stores computer usable program code; and
   a processor, wherein the processor executes the computer usable program code, and wherein the computer usable program code comprises:
      computer usable code for sending, from a first application executing using a processor and a memory in a first data processing system, a plurality of SYN packets, wherein each of the plurality of SYN packets traverses a different path in a first set of paths between the first data processing system and a second data processing system in a multipath data communication network, each of the plurality of SYN packets including a corresponding unique source identifier;
      computer usable code for selecting, at the first application, from a plurality of SYN-ACK packets, a SYN-ACK packet, wherein the selected SYN-ACK packet is first to arrive at the first application as compared to other SYN-ACK packets in the plurality of SYN-ACK packets, wherein each SYN-ACK packet in the plurality of SYN-ACK packets includes a unique source identifier of a selected SYN packet in the plurality of SYN packets;
      computer usable code for configuring a path from the first set of paths, corresponding to the selected SYN packet, as an outbound path from the first data processing system;

computer usable code for configuring a path from a second set of paths, corresponding to the selected SYN-ACK packet, as an inbound path to the first data processing system;

computer usable code for sending, in response to selecting the selected SYN-ACK packet, an ACK packet from the first application, wherein the ACK packet includes a unique source identifier of the selected SYN-ACK packet in the plurality of SYN-ACK packets, wherein the ACK packet is sent on the outbound path; and computer usable code for establishing a Transport Control Protocol (TCP) session between the first data processing system and the second data processing system using the outbound path and the inbound path.

* * * * *